(12) United States Patent
Shibuya et al.

(10) Patent No.: US 6,321,019 B1
(45) Date of Patent: Nov. 20, 2001

(54) METHOD OF ARRANGING OPTICAL FIBERS AND OPTICAL FIBERS ARRANGING MODULE

(75) Inventors: Yoshiki Shibuya; Takashi Ushikubo, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/276,117

(22) Filed: Mar. 25, 1999

(30) Foreign Application Priority Data

Mar. 31, 1998 (JP) .................................................. 10-103368

(51) Int. Cl.[7] ...................................................... G02B 6/00
(52) U.S. Cl. ............................... 385/137; 385/78; 385/115
(58) Field of Search ............................... 385/137, 51, 78, 385/76, 80, 83, 115, 120

(56) References Cited

U.S. PATENT DOCUMENTS 5,377,286 * 12/1994 Iida et al. ................................ 385/33
5,812,726 * 9/1998 Jinnai et al. ........................... 385/137
5,845,028 * 12/1998 Smith et al. ............................ 385/59

* cited by examiner

*Primary Examiner*—Cassandra Spyrou
*Assistant Examiner*—Euncha Cherry
(74) *Attorney, Agent, or Firm*—Rabin & Berdo, P.C.

(57) ABSTRACT

A method of arranging optical fibers and to an optical fiber arranging module. The method of arranging optical fibers includes inserting terminal portions of the optical fibers in a holding space which has an enough width to hold the optical fibers, reducing the width of the space so that the optical fibers are brought close, and reducing a height of the space up to length of an external diameter of the optical fiber so as to line up facets of the optical fibers. The optical fiber arranging module includes a first restraining means for restraining width of a holding space which holds terminal portions of the optical fibers, the width of the terminal portions of the optical fibers are brought close, and a second restraining means for restraining height of the holding space up to length of an external diameter of the optical fiber so as to line up facets of the optical fibers.

11 Claims, 9 Drawing Sheets

METHOD OF ARRANGING OPTICAL FIBERS AND OPTICAL FIBERS ARRANGING MODULE

FIELD OF THE INVENTION

The invention relates to a method of arranging optical fibers and to an optical fiber arranging module.

BACKGROUND OF THE INVENTION

To make wiring optical fibers easy, a ribbon fiber where optical fibers combined in like a flat cable is used. At a connecting end of the ribbon fiber, facets of the optical fibers are arranged and lined up with a specified pitch.

In order to line up the facets of the optical fibers, it is necessary to squeeze the fibers against its rigidity.

SUMMARY OF THE INVENTION

It is therefore an object of the invention to provide a method of arranging the optical fibers and an optical fiber arranging module, which make lining up facets of the optical fibers easy.

According to the invention, the method of arranging optical fibers includes inserting terminal portions of the optical fibers in a holding space which has enough width to hold the optical fibers, reducing the width of the space so that the optical fibers are brought close, and reducing a height of the space up to length of an external diameter of the optical fiber so as to line up facets of the optical fibers.

The optical fiber arranging module includes a first restraining means for restraining width of a holding space which holds terminal portions of the optical fibers, the width of the terminal portions of the optical fibers are brought close, and a second restraining means for restraining height of the holding space up to length of an external diameter of the optical fiber so as to line up facets of the optical fibers.

BRIEF DESCRIPTION OF THE DRAWING

The objects and features of the invention will become more apparent from the consideration of the following detailed description taken in conjunction with the accompanying drawings in which.

<The first embodiment>

Figure 1:
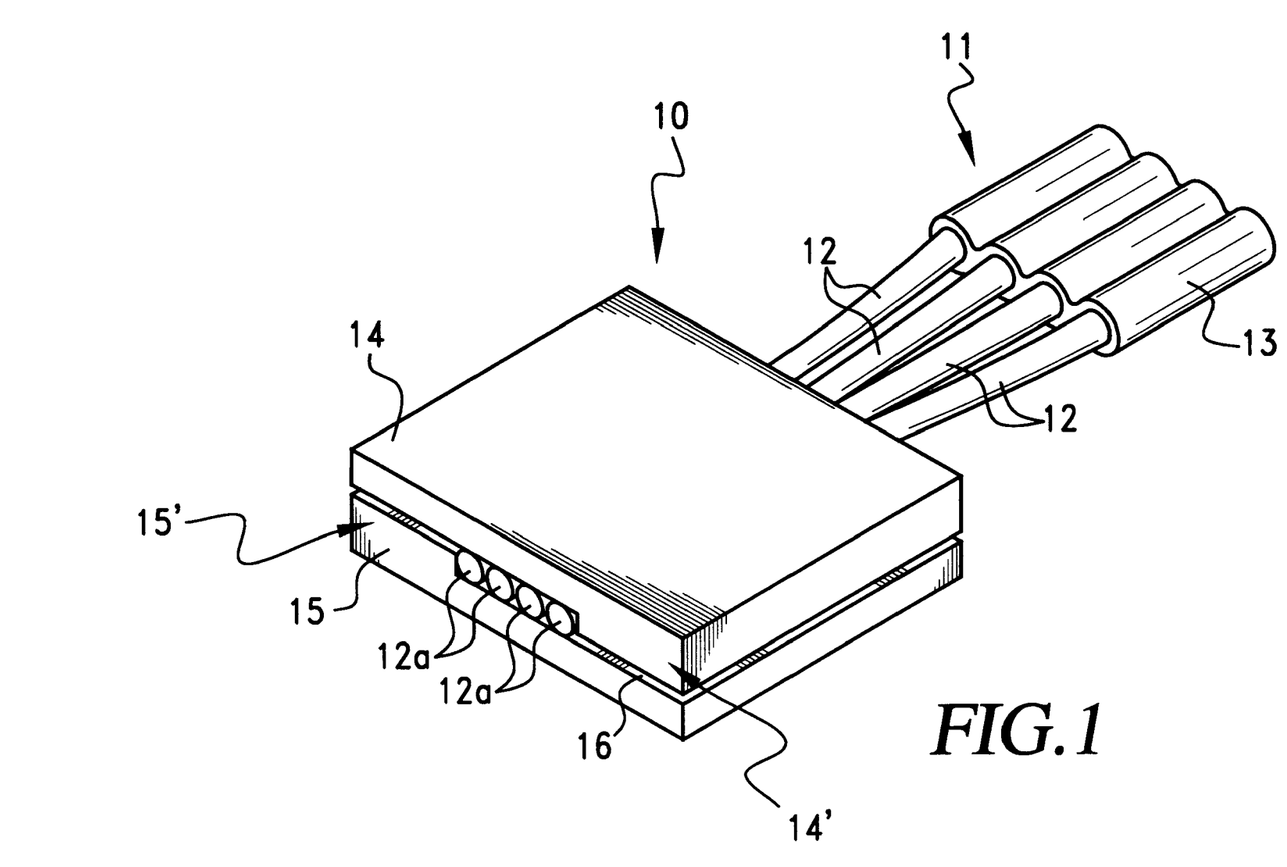
FIG. 1 is an oblique view of a first embodiment according to the invention.

Referring to FIG. 1, the first embodiment of the invention a ribbon fiber 11 is assembled in an arranging module 10. The ribbon fiber 11 has optical fibers 12 arranged with a specified distance.

In this embodiment, the ribbon fiber 11 has four optical fibers 12. An external diameter of each optical fiber 12 is 125 $\mu$m and an external diameter of each coating 13 which covers the optical fiber 12 is 250 $\mu$m. As a result, the fibers 12 are located with a pitch of 250 $\mu$m.

The coating 13 is removed at the terminal portion of the optical fibers 12. The arranging module 10 is employed to hold the optical fibers 12 so that the facets 12a of the optical fibers 12 are lined up.

The arranging module 10 has a pair of base elements 14, 15 and a bonding agent 16. The bonding agent 16 connects the base elements 14 and 15.

Figure 2:
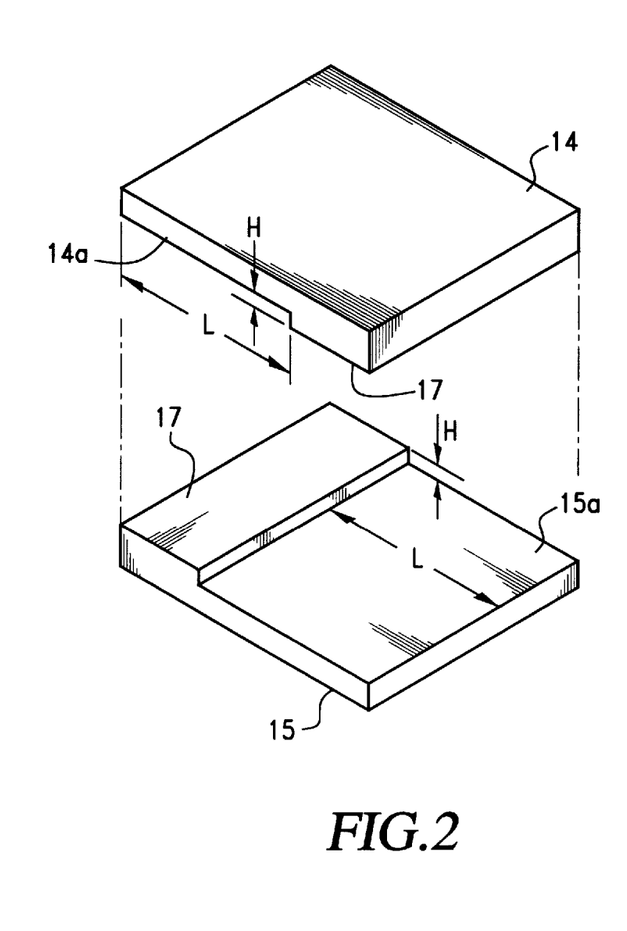
FIG. 2 is an oblique view of a pair of base elements of the first embodiment.

As shown in FIG. 2, the base elements 14, 15 are rectangular glass plates and have step portions 17 to generate a space between them. As shown, the end faces 14', 15' of the base elements are essentially perpendicular to the upper and lower major surfaces of the base elements. Lower portions 14a and 15b of the base elements 14, 15 have enough length L to hold the optical fibers 12. The sum of height (2H) of the step portions 17 is a bit larger than the external diameter of the optical fiber 12. The height H of the step portion 17 of the elements 14 may differ from the height H of the step portion 17 of the element 15.

Figure 3:
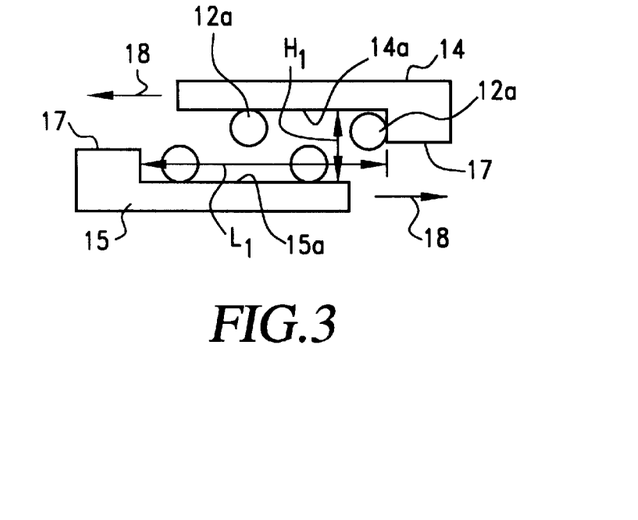
FIGS. 3 to 5 are schematic views of process of arranging optical fibers.
Figure 4:
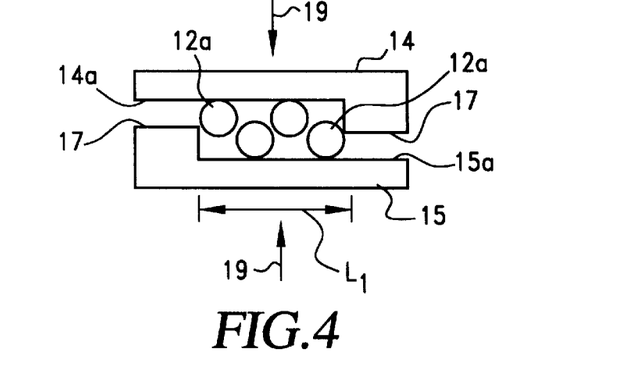
Figure 5:
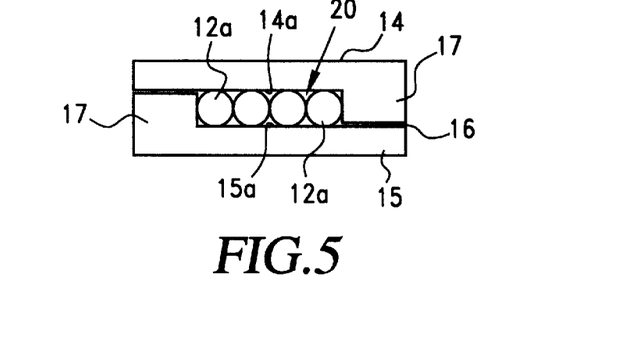

FIGS. 3 to 5 illustrate in schematic view of a process of arranging the optical fibers 12 with the arranging module 10.

As shown in FIG. 3, the base elements 14, 15 are placed to make their lower portions 14a, 15a face mutually. In a space surrounded by the step portions 17 and the lower portions 14a, 15a, the terminal portion of the optical fibers 12 are received.

The base elements 14, 15 are slid in the direction of arrow 18 so that the step portions 17 are brought close and thus the optical fibers 12 are squeezed.

As shown in FIG. 4, distance L1 is shortened to a length that is a product of multiplication of the external diameter and number of the optical fibers 12. Then the base elements 14, 15 are moved in the direction of arrow 19 so that the lower portions 14a, 15a are brought close.

As a result, as shown in FIG. 5, the optical fibers 12 are arranged in a receiving space 20. Then the base elements 14, 15 are coupled by the bonding agent 16.

When the base elements 14, 15 are made of glass which allow the penetration of ultraviolet rays, a bonding agent that is hardened by irradiation of ultraviolet rays is convenient for coupling the elements 14, 15.

After coupling the base elements 14, 15, facets 12a of the optical fibers 12 are ground by grinding portions of the fibers projecting past the end faces 14', 15'. If necessary, anti-reflex coating is formed on the facets 12a.

As described above, according to the first embodiment, in the first step, the optical fibers 12 are squeezed within a specified width. And in the second step, the facets 12a of the fibers 12 are lined up.

In the first embodiment, a pair of base elements 14 and 15 is the first restraining means which squeeze the optical fibers 12, and is also the second restraining means which line up the facets 12a of the fibers 12.

<The second embodiment>

Figure 6:
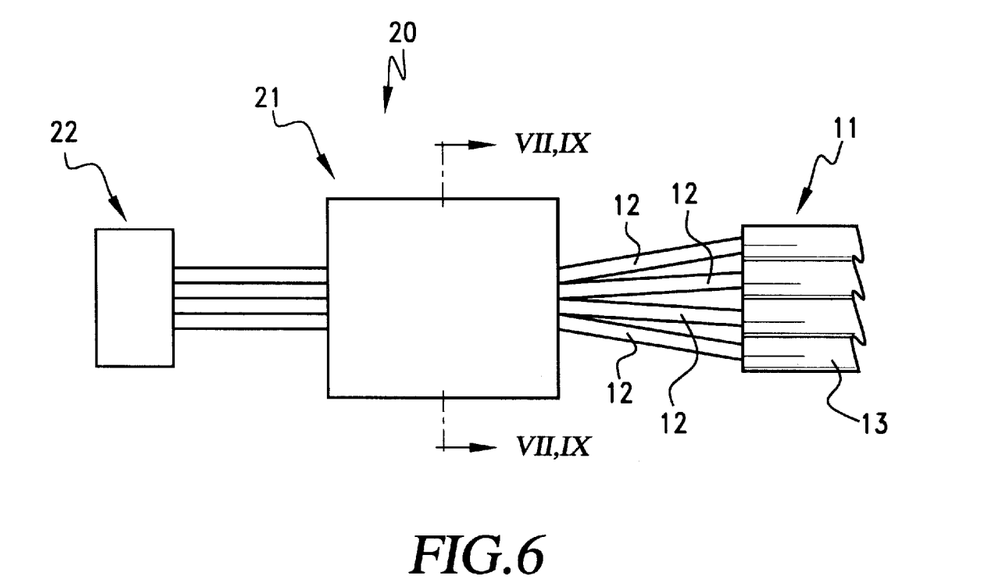
FIG. 6 is a plan view of a second embodiment according to the invention.

Referring to FIG. 6, in the second embodiment of the invention, optical fibers 12 are arranged with a first restraining means 21 and a second restraining means 22. The first restraining means 21 is disposed between the terminal of the optical fibers 12 and the end of the coating 13. The second restraining means 22 is disposed at the terminal of the fibers 12.

Figure 7:
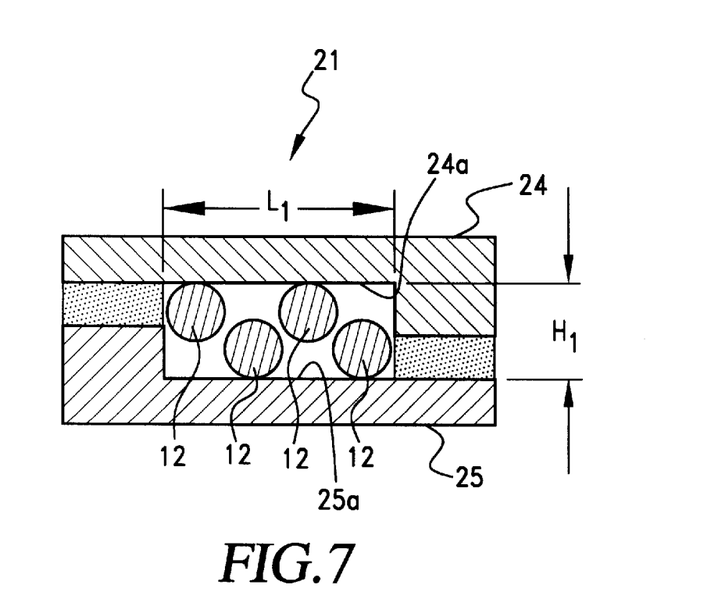
FIG. 7 is a sectional view of a first restraining means of the second embodiment.

As shown in FIG. 7, the first restraining means 21 comprises a pair of base elements 24, 25 and a bonding agent 26. Distance L1 between the step portions 27 is almost a product of multiplication of an external diameter and number of the optical fibers 12. Meanwhile, distance H1 between the lower portions 24a, 25a is larger than the external diameter of the fiber 12.

Figure 8:
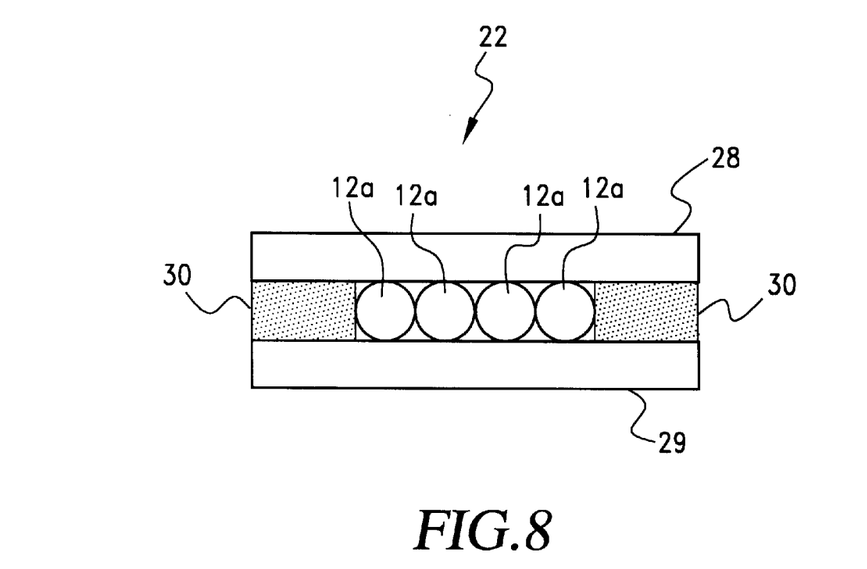
FIG. 8 is a sectional view of a second restraining means of the second embodiment.

As shown in FIG. 8, the second restraining means 22 comprises a pair of flat plates 28, 29 and a bonding agent 30. The plates 28, 29 are made of, for example, glass. The optical fibers 12 are lined up with the plates 28, 29.

<The third embodiment>

Figure 9:
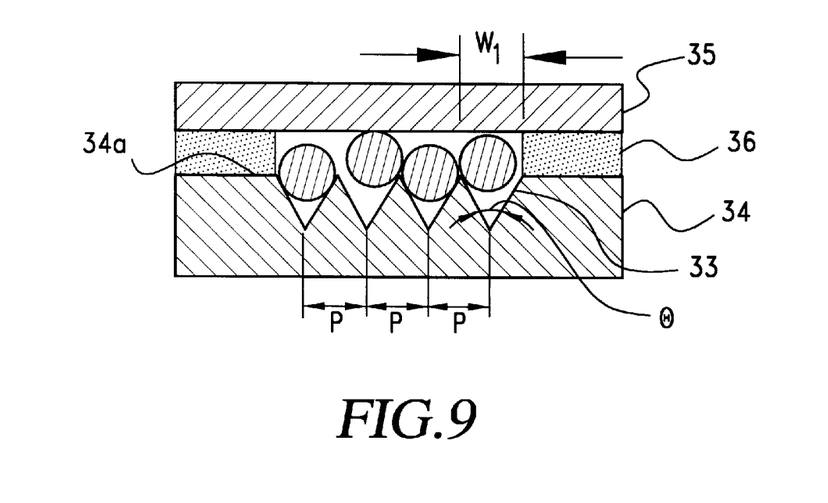
FIG. 9 is a sectional view of a third embodiment according to the invention.

Referring to FIG. 9, in the third embodiment of the invention, a base element 34 having V-grooves 33 and a flat plate 35 are employed instead of the base elements 14, 15 of the second embodiment.

The base element 34 is made of, for example, glass, ceramics or silicon substrate. The base 34 has V-grooves 33 in order to hold the optical fibers 12. The V-grooves 33 can be formed by mechanical grinding or etching.

V-grooves 33 are formed with a pitch P, for example, 127 $\mu$m. That is a bit larger than the external diameter of the optical fiber 12. Angle θ of the V-grooves 33 is, for example, 90 degrees. Opening width W1 of the grooves 33 is preferably a bit larger than the external diameter of the optical fiber 12.

After the optical fibers 12 are received in the V-grooves 33, the flat plate 35 is coupled to the base element 34 with a bonding agent 36.

<The fourth embodiment>

Figure 10:
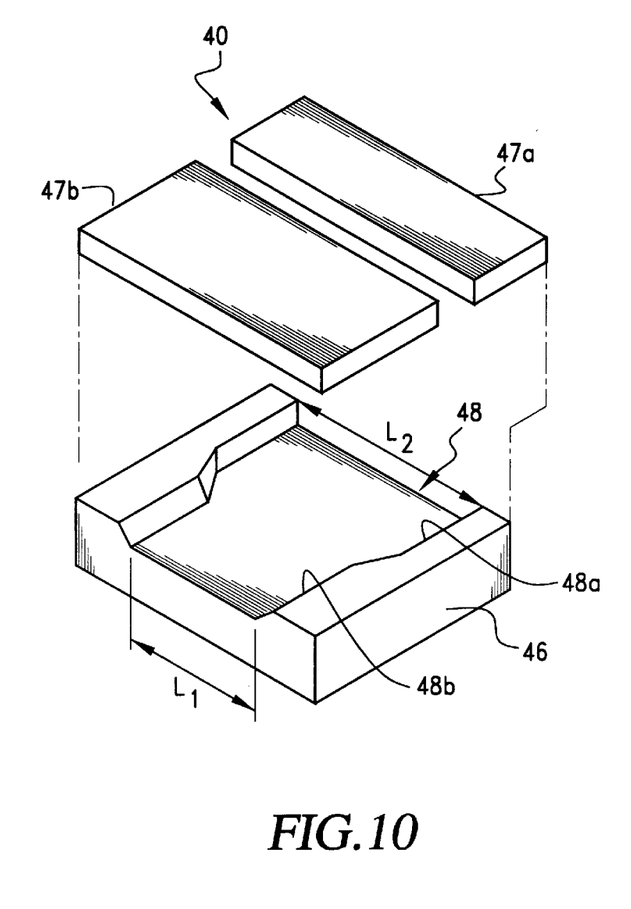
FIG. 10 is an oblique view of a fourth embodiment according to the invention.

Referring to FIG. 10, in the fourth embodiment, an arranging module 40 comprises base element 46 and cover plates 47a, 47b. The base element 46 has a groove 48 to hold the optical fibers. The groove 48 is a combination of a relatively wide groove portion 48a extending to one end of the base element 46 and a relatively narrow groove portion 48b extending to the opposite end of the base element 46.

Width L2 of the wide groove portion 48a is larger than the sum of the external diameter of the optical fibers. Width L1 of the narrow groove portion 48b is the sum of the external diameter of the fibers.

The depth of the groove portions 48a, 48b is almost the same as the external diameter of the optical fiber. For easy arrangement, when the external diameter of the fiber is 125 $\mu$m, the depth of the wider groove portion 48a is preferably 127$\mu$m and that of the narrow groove portion 48b is 125 $\mu$m.

The base element 46 can be formed with material such as glass or ceramics. When semiconductor crystal is used for the base element 46, the groove 48 is formed easily by conventional etching.

The base element 46 may be separated into two parts corresponding to the wide groove portion 48a and the narrow groove portion 48b. The cover plates 47a, 47b can be formed as a single cover plate.

Figure 11:
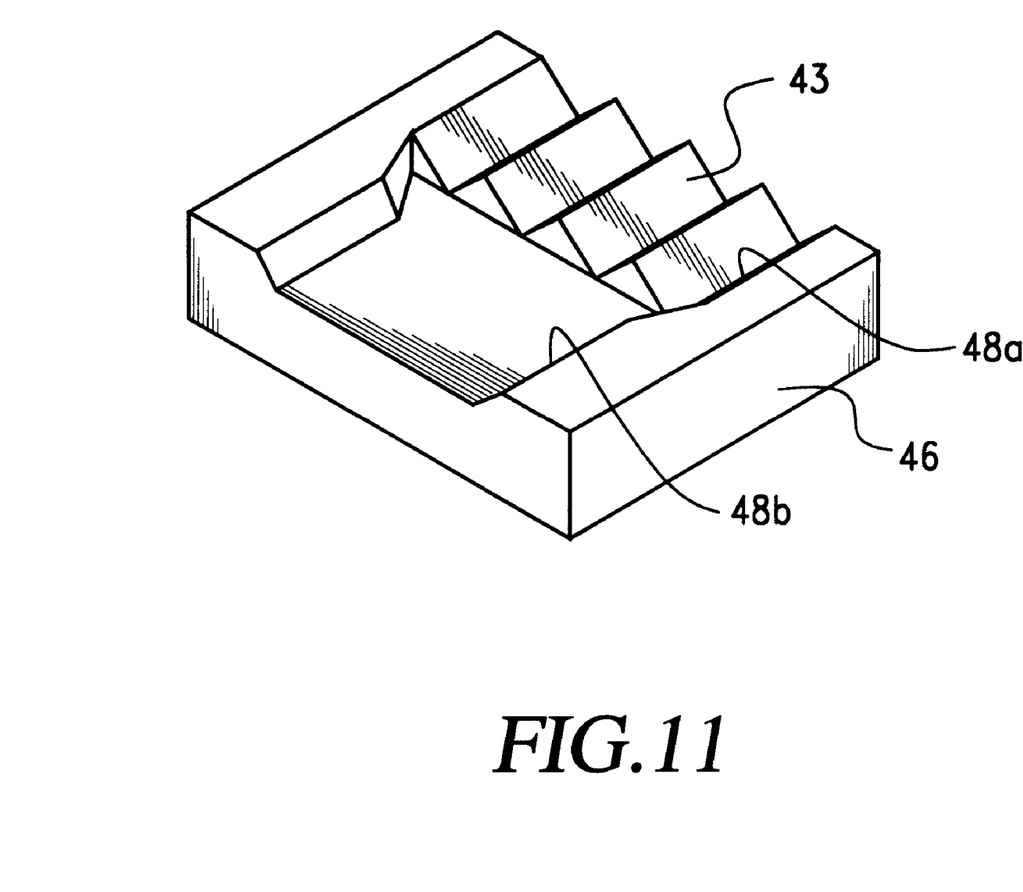
FIG. 11 is an oblique view of a modification of the fourth embodiment.

Referring to FIG. 11, in a modification of the base element 46, V-grooves 43 are formed in the wide groove 48a to guide the optical fibers 12.

<The fifth embodiment>

Figure 12:
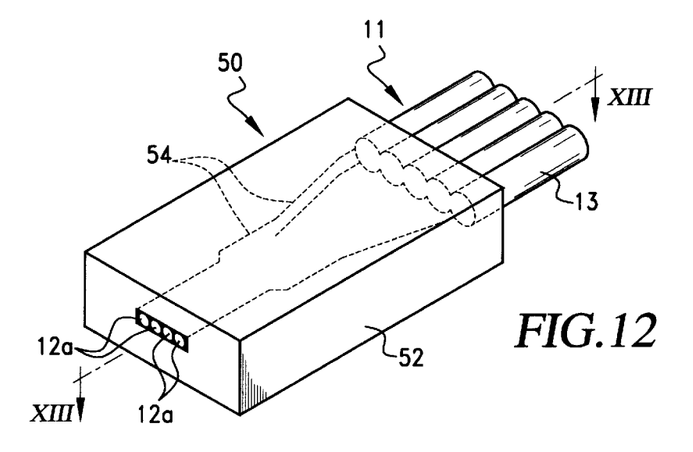
FIG. 12 is an oblique view of a fifth embodiment according to the invention.
Figure 13:
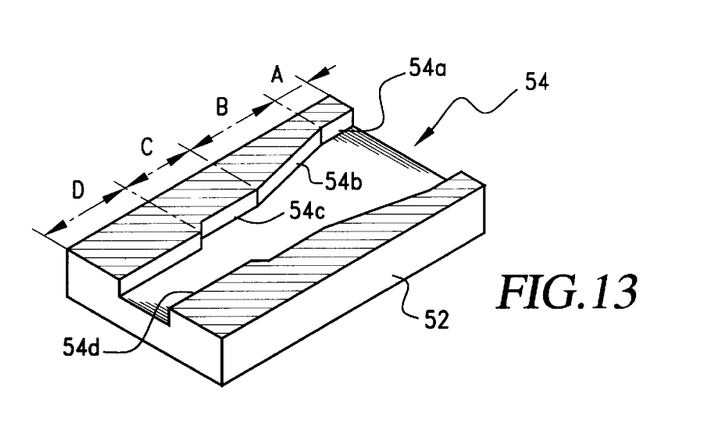
FIG. 13 is an oblique sectional view of the fifth embodiment.
Figure 14:
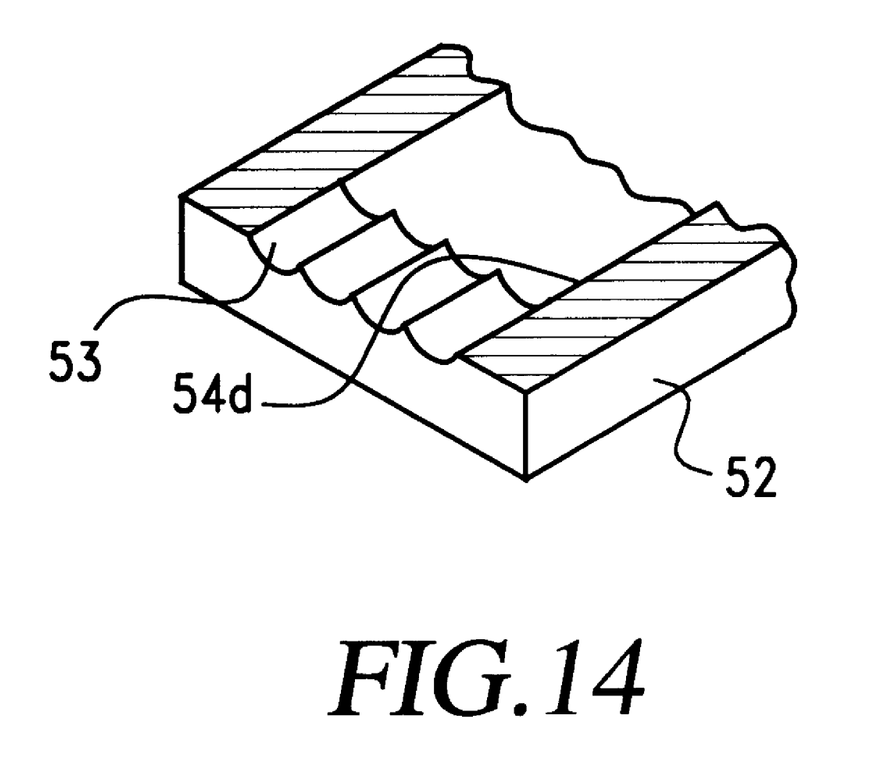
FIG. 14 is an oblique sectional view of a modification of the fifth embodiment.

Referring to FIGS. 12 to 14, in the fifth embodiment of the invention, an optical fiber arranging module 50 is formed monolithically by injection molding.

The arranging module 50 has a hole 54 piercing from one end to the opposite end of a base element 52. The optical fibers 12 of the ribbon fiber 11 are inserted from the wider opening of the hole 54.

As shown in FIG. 13, the hole 54 includes a receiving portion 54a, guide portion 54b, a first sleeve 54c and a second sleeve 54d. The receiving portion 54a holds the coating 13 of the ribbon fiber 11. The first sleeve 54c has enough width and height to receive the optical fibers 12. The second sleeve 54d has a width that almost matches with the sum of the external diameter of the optical fibers 12 and has a height that almost matches with the height of the fibers.

For example, when the external diameter of the optical fiber 12 is 125 $\mu$m, the width of the first sleeve 54c is 508 $\mu$m (127 $\mu$m×4) and its height 127 $\mu$m. And the width of the second sleeve 54d is 500 $\mu$m (125 $\mu$m×4) and its height is 125 $\mu$m. The width of the guide portion 54b is gradually reduced form the receiving portion 54a to the first sleeve 54c.

The first sleeve 54c acts as a first restraining means to squeeze the optical fibers 12. The second sleeve 54d acts as a second restraining means to line up the fibers 12.

The receiving portion 54a and the guide portion 54b are not necessary, but make the inserting of the optical fibers 12 easily.

Referring to FIG. 14, in a modification of the base element 52, guide grooves 53 are formed in the second sleeve 54d to guide the optical fibers 12. And the guide grooves 53 may also be formed in the first sleeve 54c.

As described above, according to the invention, the optical fibers are squeezed within a specified width in the first step. Then the facets of the fibers are lined up in the second step. Therefore, it is easy to arrange and line up the facets of the optical fibers with a specified pitch.

What is claimed is:

1. A method of arranging optical fibers, comprising:
   providing at least a first base element and a second base element that collectively define a holding space;
   inserting terminal portions of optical fibers protruding from an optical ribbon fiber, in the holding space which has a width sufficient to hold said optical fibers;
   reducing said width of said holding space so that said optical fibers are brought close;
   reducing a height of said holding space up to a length of an external diameter of said optical fibers so as to line up facets of said optical fibers; and
   fixing said first base element to said second base element using a bonding agent, while keeping the holding space free of the bonding agent.

2. The method according to claim 1, wherein said first base element and said second base element collectively form an arranging module; and wherein said arranging module has opposing major surfaces, and opposing end faces that are essentially perpendicular to the major surfaces, with the holding space extending from one end face to the opposing end face.

3. A method of arranging optical fibers, comprising:
   providing first and second restraining means, each defining a holding space;
   coating parts of said first and second restraining means with a bonding agent, while keeping the holding spaces free of the bonding agent;
   inserting terminal portions of optical fibers in the holding space of the first restraining means, the holding space of the first restraining means having a width sufficient to hold said optical fibers;
   reducing said width of said holding space of said first restraining means so that said optical fibers are brought close;

reducing a height of the holding space of the second restraining means up to a length of an external diameter of said optical fibers so as to line up facets of said optical fibers; and fixing the parts of the first and second restraining means using the bonding agent.

4. The method according to claim 3, wherein said first restraining means comprises a pair of base elements which form said holding space so as to receive said terminal portions of said optical fibers.

5. The method according to claim 4, wherein said pair of base elements respectively include step portions at opposite sides of each other so as to provide said holding space of said first restraining means, the bonding agent being disposed on the step portions.

6. The method according to claim 3, wherein said second restraining means comprises a pair of flat plates.

7. The method according to claim 3, wherein said second restraining means is separate and spaced apart from said first restraining means.

8. The method according to claim 5, wherein the step portions and the bonding agent form the holding space of said first restraining means to have a height that is greater than a diameter of said optical fibers.

9. A method of arranging optical fibers, comprising:

providing a first restraining means having a first holding space, and a second restraining means having a second holding space;

arranging the second restraining means to be separated from the first restraining means by a space along a length of optical fibers;

inserting terminal portions of the optical fibers in the first holding space and in the second holding space, the first holding space having a width sufficient to hold said optical fibers;

reducing the width of the first holding space so that the optical fibers are brought close;

reducing a height of the second holding space up to a length of an external diameter of the optical fibers so as to line up facets of the optical fibers;

wherein said first restraining means comprises a pair of base elements which form the first holding space; and fixing said pair of base elements together with a bonding agent while keeping the first holding space free of the bonding agent.

10. The method according to claim 9, wherein the pair of base elements respectively include step portions at opposite sides of each other so as to provide the first holding space.

11. The method according to claim 10, wherein the second restraining means comprises a pair of flat plates spaced apart from each other to form the second holding space.

* * * * *